United States Patent [19]
Reynolds et al.

[11] 3,784,955
[45] Jan. 8, 1974

[54] CONNECTING DEVICE FOR PRINTED CIRCUIT BOARD

[75] Inventors: Charles Edward Reynolds, Camp Hill; Eugene Leonard Gombar, Harrisburg, both of Pa.

[73] Assignee: AMP Incorporated, Harrisburg, Pa.

[22] Filed: Feb. 23, 1973

[21] Appl. No.: 335,203

Related U.S. Application Data

[62] Division of Ser. No. 111,402, Feb. 1, 1971, Pat. No. 3,718,895.

[52] U.S. Cl. .................................... 339/17 R
[51] Int. Cl. ......... H01r 5/04, H01r 9/12, H05k 1/02
[58] Field of Search ................. 339/17, 95, 18, 256, 339/258, 275, 220, 221, 192, 176

[56] References Cited

UNITED STATES PATENTS

| | | | |
|---|---|---|---|
| 3,608,640 | 9/1971 | Longenecker et al. | 339/258 P X |
| 3,384,865 | 5/1968 | Bosworth | 339/258 P X |
| 3,659,243 | 4/1972 | Gluntz | 339/192 R |
| 3,428,934 | 2/1969 | Reider, Jr. et al. | 339/17 R |
| 3,665,378 | 5/1972 | Hammell et al. | 339/256 R |
| 3,673,551 | 6/1972 | McDonough | 339/258 R |

*Primary Examiner*—Joseph H. McGlynn
*Assistant Examiner*—Terrell P. Lewis
*Attorney*—William J. Keating, Frederick W. Rarin and Jay L. Seitchik

[57] ABSTRACT

Printed circuit board has connecting device mounted thereon and soldered to a conductor on the board. The connecting device has a mounting portion which extends into a hole in the PC board and a receptacle portion which extends above the surface in the board. The receptacle portion is offset from the hole in the PC board and the mounting portion is hemi-ellipsoidal and faces away from the receptacle portion. Solidified solder is in the hole and bonded to an external side of the receptacle portion but is not flowed into the receptacle portion.

5 Claims, 3 Drawing Figures

CONNECTING DEVICE FOR PRINTED CIRCUIT BOARD

BACKGROUND OF THE INVENTION

This application is a Division of application Ser. No. 111,402 filed Feb. 1, 1971, which issued on Feb. 27, 1973, as U.S. Pat. No. 3,718,895. The parent application is hereby incorporated by reference in its entirety.

Figure 1:
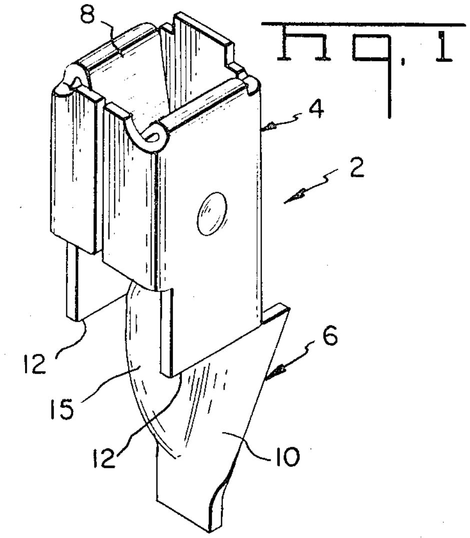
FIG. 1 is a perspective view of a connecting device used in the practice of the invention.
Figure 2:
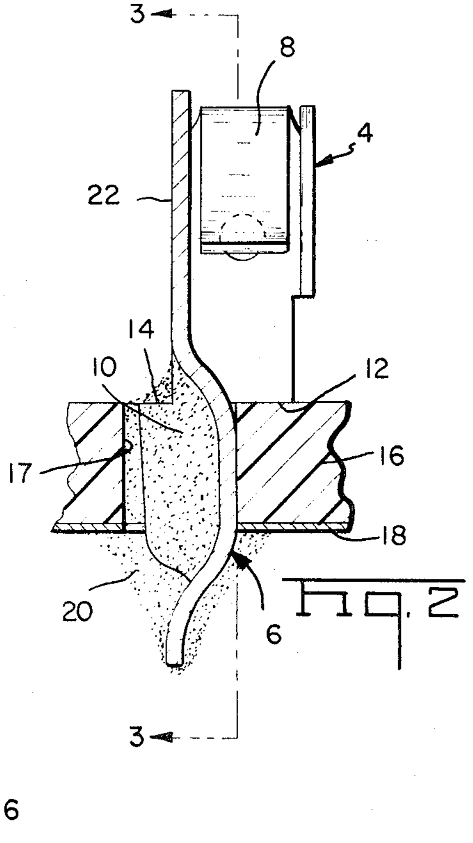
FIG. 2 is a sectional sideview of the connecting device of FIG. 1 mounted on a printed circuit board in accordance with the invention.
Figure 3:
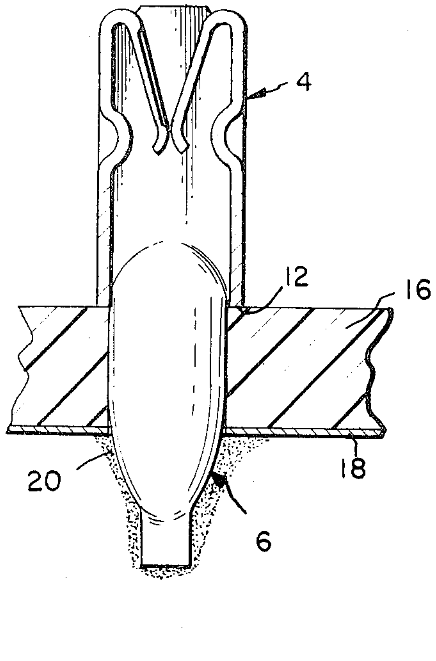
FIG. 3 is a view taken along the lines 3—3 of FIG. 2.

A connecting device 2 used in the practice of the invention comprises a receptacle portion 4 and a mounting portion 6. The receptacle portion 4 is a box-like structure having contact springs 8 which engage a lead from an electrical component or the like upon insertion of the lead into the receptacle. The mounting portion 6 is generally hemi-ellipsoidal throughout a portion of its length and has a web 15 and sidewalls 10 which are directed away from the receptacle portion 4. The mounting portion is disposed in a hole 17 in a printed circuit board 16 with the web 15 and the sidewalls 10 against the sides of the hole.

The receptacle portion 4 has edges 12 at its lower end which are against the surface of the board 16 adjacent to the hole 17. The mounting portion 6 has edges 14 at the upper ends of the sidewalls which are flush with the upper surface of the printed circuit board. Solidified solder 20 occupies the interior of the hole 17 and is bonded to the surface of the mounting portion 6 and to a conductor 18 on the lower side of the board. The solder normally extends upwardly on the external or rearwardly facing side 22 of the receptacle portion as a result of capillary action during application of solder to the board.

A significant advantage of the invention is that the solder does not flow into the interior of the receptacle portion 4 and interfere with the functioning of the contact springs 8. This advantage is achieved by virtue of the offset relationship of the receptacle portion with reference to the mounting portion 6 and by virtue of the hemi-ellipsoidal shape of the mounting portion. Precise and accurate positioning of the terminal or connecting device on the board is achieved by virtue of the edges 12 and 14 which ensure that the connecting device extends true from the board and is located with the lower end of the mounting portion against the board.

Further advantages of the invention and additional structural details of the invention are explained fully in the specification of the U.S. Pat. No. 3,718,895.

What is claimed is:

1. A one piece stamped and formed connecting device which is mounted on a printed circuit board and soldered to a conductor on said board, said device comprising:

a receptacle portion and a mounting portion, said receptacle portion having a first wall and a pair of walls extending from said first wall in one direction, said mounting portion having a generally U-shaped cross-section comprising a bight and sidewalls extending over at least a portion of its length, said bight being integral with said first wall, said sidewalls extending laterally in a direction other than said first direction and laterally beyond said first wall, said pair of walls having first lateral edges adjacent to said mounting portion which face the free end of said mounting portion, and said sidewalls having second lateral edges adjacent to said receptacle portion which face the free end of said receptacle portion, said first and second edges all being substantially in one plane, said mounting portion extending into a circular hole in said printed circuit board said second lateral edges being substantially flush with one side of said printed circuit board and said first lateral edges being substantially against said one side of said board adjacent to said hole, and solder in said hole and in said mounting portion.

2. A device as set forth in claim 1 wherein said mounting portion is generally hemi-ellipsoidal.

3. A device as set forth in claim 1 wherein said receptacle portion has a wall opposed to said first wall, said receptacle portion having resilient means therein for engagement with an inserted conductor.

4. A device as set forth in claim 1 wherein said receptacle portion has spring means extending from at least one of said walls and reversely bent to extend between said walls, said device having a solder resistant coating on the interior surfaces of said walls.

5. A one piece stamped and formed connecting device, said device being mounted in a circular hole in a printed circuit board and soldered to a conductor on the side of said board which is opposite to the side on which said device is mounted, said device comprising:

a generally hemi-elliposidal mounting portion having, as viewed in transverse cross-section, a bight and sidewalls, a receptacle portion having one side which merges with said bight of said mounting portion, said receptacle portion having additional sides which extend from the longitudinal edges of said one side, said one side and said additional side forming an enclosure which is adapted to receive a conductor, said enclosure having a longitudinal axis which is offset, in one lateral direction, from the longitudinal axis of said mounting portion, said sidewalls of said mounting portion being directed in a lateral direction opposite to said one direction whereby, said receptacle portion is laterally offset from said hole, and upon soldering of said mounting portion to said conductor, solder will enter said mounting portion filling the space between said sidewalls and will be prevented from entering said receptacle portion.

* * * * *